A. H. SNOOK & C. O. TRIPP.
TONGUE TRUCK.
APPLICATION FILED OCT. 14, 1911.
1,014,672.
Patented Jan. 16, 1912.
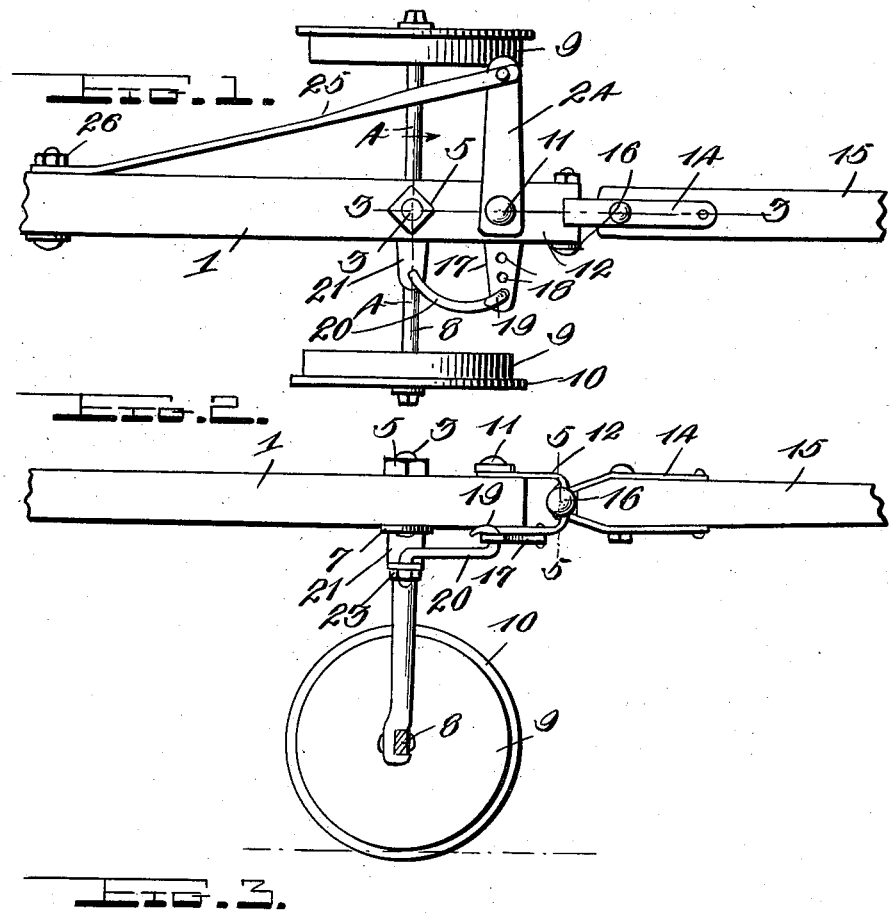
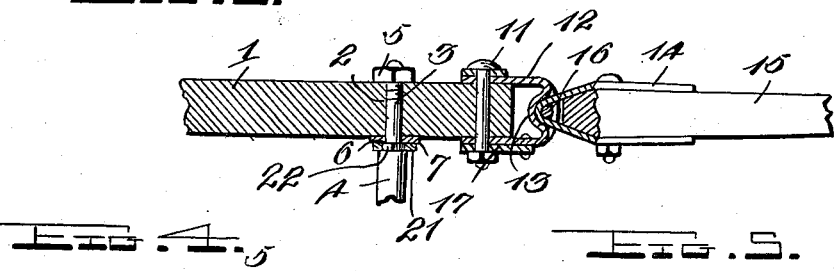
Witnesses
Chas. L. Griestauer.
L. G. Ellis.
Inventors
A. H. Snook and
C. O. Tripp,
By Watson E. Coleman.
Attorney

UNITED STATES PATENT OFFICE.

ABRAM H. SNOOK AND CLAUDE O. TRIPP, OF WINFIELD, KANSAS.

TONGUE-TRUCK.

1,014,672.  Specification of Letters Patent.  Patented Jan. 16, 1912.

Application filed October 14, 1911. Serial No. 654,611.

*To all whom it may concern:*

Be it known that we, ABRAM H. SNOOK and CLAUDE O. TRIPP, citizens of the United States, residing at Winfield, in the county of Cowley and State of Kansas, have invented certain new and useful Improvements in Tongue-Trucks, of which the following is a specification, reference being had to the accompanying drawings.

Our invention relates to new and useful improvements in tongue trucks for harvesters, cultivators, binders and any other similar agricultural implements requiring a supporting truck and has for its object to provide a truck which is adapted to turn with the draft, thereby lessening the exertion required and preventing the machine to which the truck is secured from tilting or turning.

A further object of the invention resides in providing adjustable means whereby the turn of the truck may be increased or decreased as desired.

Still another object of the invention resides in providing few and simple parts which may be readily aplied and quickly removed, which parts are durable in construction and very effective and useful in operation.

With these and other objects in view, our invention consists in the novel features of construction, combination and arrangement of parts, as will be hereinafter referred to and more particularly pointed out in the specification and claims.

In the accompanying drawing, forming a part of this application, Figure 1 is a top plan view of the device; Fig. 2 is a side elevation thereof; Fig. 3 is a longitudinal section as seen on line 3—3 Fig. 1; Fig. 4 is a vertical section as seen on line 4—4 Fig. 1; and Fig. 5 is a vertical section as seen on line 5—5 Fig. 2.

In carrying out our invention we shall refer to the drawings, in which similar reference characters designate corresponding parts throughout the several views and in which 1 indicates a stub tongue adapted to be secured to any desired agricultural implement (not shown) and extending through an opening 2 in the front end of said stub tongue 1 is the reduced end 3 of an enlarged bolt or the like 4, the free end of said reduced portion 3 being threaded to receive a nut 5 which engages the upper face of the tongue 1 and limits the downward movement of said bolt with respect thereto. The bolt 4 is provided below the under face of the tongue 1 with a shoulder 6 upon which rests a washer 7 whereby it will be seen that the upward movement of said bolt 4 with respect to the tongue will be limited and the lower end of said bolt 4 is pivotally connected to the central portion of a nonrotatable axle 8, said axle having mounted on the ends thereof a pair of supporting wheels 9 which are provided on their edges with the outer peripheral flanges 10.

Extending through the stub tongue 1, immediately adjacent the forward end thereof, is an additional and smaller bolt 11 which has engaged therewith the arms of a U-shaped plate 12, said arms extending above and below the upper and lower faces of said tongue 1 and the base of this U shaped plate 11, which extends forwardly of the end of the tongue 1, has a portion thereof struck inwardly therefrom, as shown at 13, within which is disposed the base of a U shaped clip 14 carried on the inner end of a draft tongue 15. A bolt 16 extends through the portion 13 and the clip 14 to pivotally connect said draft tongue to the plate 12 and from the construction described it will be seen that the said tongue may be raised or lowered and may also be moved laterally with respect to the stub tongue 1, in view of the pivotal engagement of the plate 12 with said stub tongue.

In order to provide means whereby the truck may be turned with the tongue 15, a plate 17 is secured to the under arm or face of the U shaped plate 12 and through which the bolt 11 also extends, said plate having a portion thereof extending laterally to one side of the stub tongue 1, in which portion is provided a plurality of openings 18. Engaged with one of these openings 18 is the hooked end 19 of an arcuately designed rod or arm 20, the opposite end of said arm or rod being depended in an opposite direction from that from which the hook is directed and is loosely mounted in an opening in a plate 21 securely carried on the bolt 4. This plate 21 is mounted on a squared portion 22 of the bolt 4 immediately adjacent the shoulder 6 on said bolt and extends laterally therefrom and the dependent end of the arm 20, which extends through the opening in the end of said plate is threaded to receive a nut 23 to retain said arm in engagement with the plate. From this construction it will be seen that as the tongue 15 is moved laterally in either one direction or the other, the plate 17 carried on the U shaped plate 12 will be correspondingly disposed in a similar direction to in turn cause the rod or arm 20 to dispose the plate 21 in a similar direction which, of course, will dispose the axle in the direction in which the tongue 15 is disposed.

The openings 18 in the plate 17 are disposed in lateral alinement and it will be appreciated that from the construction of the arm 20 and its adjunctive parts that the same may be arranged to allow the hooked portion 19 thereof to engage any of said openings so that said arm may be adjusted to correspondingly adjust the turn which the truck will make. When adjusted to engage an opening nearer the stub tongue, the turn of the truck will be decreased and vice versa when adjusted to an opening toward the outer end of the plate 17.

From the foregoing it will be seen that we have provided an improved tongue truck adapted for application to any desired agricultural implement wherein the truck may be caused to turn with the turning of the draft tongue.

It will further be seen that we have provided adjustable means connecting the axle of the truck indirectly with the tongue whereby the turn of the truck may be decreased or increased as desired.

It will still further be seen that our device requires but few operating parts, all of which are so applied as to be readily removed in case of damage thereto and furthermore, it will be seen that the device, in general, is extremely simple and durable in construction, inexpensive to manufacture and one which is very effective and useful in operation.

Secured to the bolt 11 above the upper face of the stub tongue 1, is an elongated plate 24 which extends in a direction opposite that to which the plate 17 extends, and the free end of said plate 24 has removably engaged therewith, one end of an arm 25, the opposite end of said arm being secured to said stub tongue by means of the bolt 26. This arm and plate permit of an equalizer being carried thereon, and it will be seen that when the operating parts of the device are reversed, this plate and arm may be disposed on the opposite side of the stub tongue 1 to accord therewith.

Having thus described our invention what we claim is:

A tongue truck of the class described comprising a stub tongue, a bolt extending vertically through the tongue adjacent the forward end thereof, an axle mounted on the lower end of said bolt and provided with supporting wheels at its ends, a U shaped plate pivotally mounted on a vertical axis at the forward end of said tongue, a draft tongue pivotally mounted on the horizontal axis of the U shaped plate, an additional plate carried on the U shaped plate and extending laterally therefrom, said latter plate being provided with a plurality of openings, an arm having one end thereof engaged with an opening in the last referred to plate, an additional laterally extending plate carried on the aforesaid bolt and provided with an opening adjacent its end thereof, the opposite end of said arm being loosely extended through the opening in the last referred to plate, and removable means to prevent the disengagement of said arm upon the same.

In testimony whereof we hereunto affix our signatures in the presence of two witnesses.

ABRAM H. SNOOK.
CLAUDE O. TRIPP.

Witnesses:
M. C. JARVIS,
F. E. JARVIS.

Copies of this patent may be obtained for five cents each, by addressing the "Commissioner of Patents, Washington, D. C."